April 14, 1959 D. B. GARDNER 2,881,519
PRUNING SAW ATTACHMENT
Filed June 26, 1958
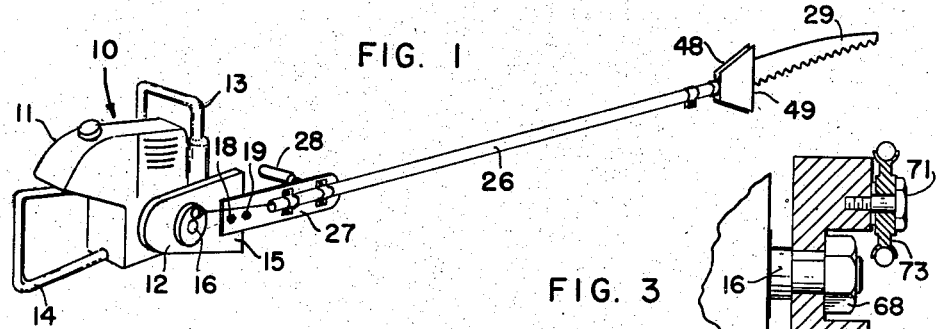
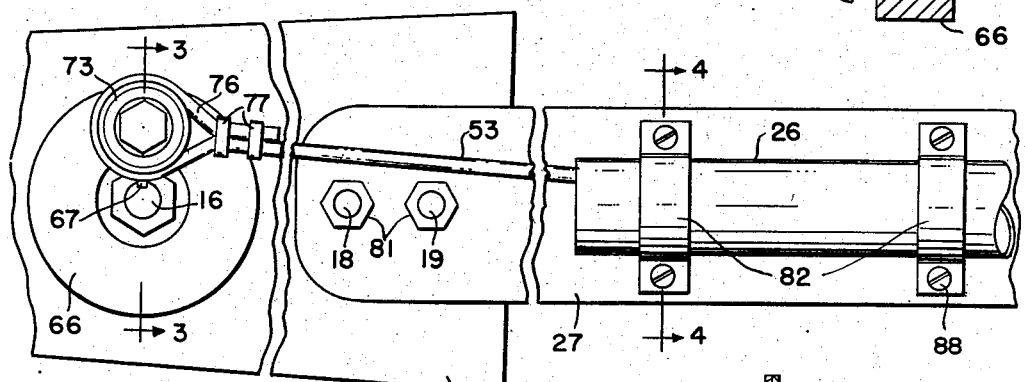
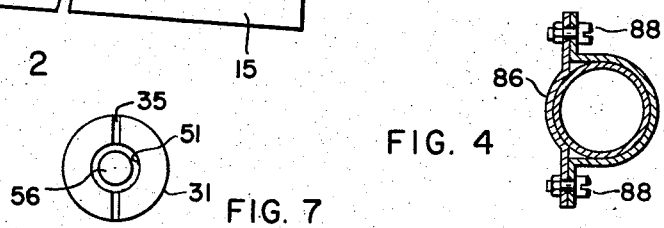
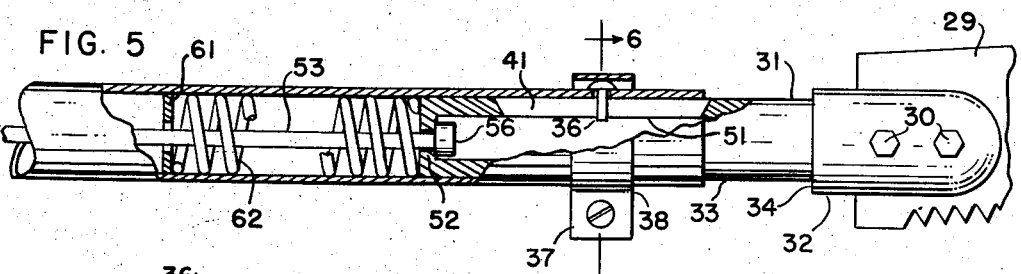
INVENTOR.
DONALD B. GARDNER
BY
Ramsey and Kolisch
ATTYS.

United States Patent Office 2,881,519
Patented Apr. 14, 1959

2,881,519

PRUNING SAW ATTACHMENT

Donald B. Gardner, Portland, Oreg.

Application June 26, 1958, Serial No. 744,858

9 Claims. (Cl. 30—166)

This invention relates to portable saw apparatus, and more particularly to an attachment for a portable power unit such as a power driven chain saw unit wherein the unit may be converted into a highly effective and easily manipulated power operated pruning saw device.

A common piece of equipment used by loggers is the conventional chain saw which comprises a portable internal combustion engine, a frame, a saw blade detachably mounted to a support portion of the frame, and a saw chain connected to the engine and trained about the saw blade. The unit is highly practical in cutting either standing timber or fallen logs. However, the saw blade of the unit which supports the chain is usually not very long, or if it does have any length, is quite heavy. Thus the unit is not particularly useful for trimming or pruning branches from standing timber located at any appreciable elevation from the ground.

Pruning the branches of standing timber or trees has been widely practiced in orchards, parks, and like operations. More recently, pruning has assumed greater importance in another field. With the continued growth of so-called "tree farms" as part of the lumber industry's program for a sustained yield, timber is harvested at a younger age than previously. To improve the quality of lumber produced from relatively young timber, it is the practice to prune trees of their lower branches so as to reduce the number of knots and other imperfections created by the presence of the limbs. Thus the attachment of this invention is especially useful to loggers.

In general terms, this invention contemplates an attachment which is secured to the frame of a portable chain saw unit by first removing the saw chain, the saw blade of the unit, and the usual sprocket driving the saw chain of the unit. Instead of the saw blade, there is secured to the unit frame an elongated hollow tube or mounting section. Preferably the tube section is made of light metal, to reduce the over-all weight of the attachment. The circular configuration of the tube section walls lends considerable rigidity to the section for a given amount of mass.

Slidably mounted in the outer end of the tube section for reciprocal movement longitudinally thereof is a saw mount or plunger element. A pruning saw has its inner end connected to the saw mount to reciprocate therewith. The pruning saw is relatively narrow and of light mass, with exposed cutting and trailing edges, so that the body of the pruning saw is free to pass unobstructed through the saw kerf produced during a cut.

To produce reciprocal movement of the pruning saw, a biasing means or coil spring is interposed between the tube section and the saw mount, which urges the saw mount together with the saw outwardly to an extended position. The saw and saw mount are drawn inwardly to a retracted position periodically by means of a flexible cable secured at one end to the saw mount and at its other end to a crank member fixed to the power output shaft of the unit. The flexible cable extends down the interior of the hollow tube section and is thus shielded by the walls of the tube section. The construction may be made of components of relatively light mass, so that the entire attachment is relatively light in weight.

A principal object of this invention, therefore, is to provide a light, easily manipulated attachment for a power chain saw unit which converts the unit into a highly effective pruning attachment.

A more specific object is to provide a pruning saw attachment wherein actuation of the pruning saw of the attachment is by means of a tensioned cable producing movement of the saw in one direction and a biasing means urging the saw in the opposite direction.

A further object is to provide an attachment having a reciprocating pruning saw wherein the saw is mounted on an elongated tube section, and wherein the actuating means producing reciprocal movement of the saw is threaded through the hollow interior of the tube section.

The invention also concerns a novel mounting for the tube section, and means connecting the cable to the output shaft of a power chain saw unit.

These and other objects are attained by the invention, which is described hereinbelow in conjunction with the accompanying drawings wherein:

Fig. 1 is a perspective view, showing the power unit of a chain saw, and an attachment constructed according to an embodiment of this invention connected to the power unit;

Fig. 2 is an enlarged view of that portion of the attachment which is adjacent the chain saw motor frame;

Fig. 3 is a section of view along the line 3—3 in Fig. 2 illustrating details of a crank member present in the attachment;

Fig. 4 is a section of view along the line 4—4 in Fig. 2;

Fig. 5 is a view of the outer end of the attachment, partly broken away better to illustrate details of construction;

Fig. 6 is a sectional view along the line 6—6 in Fig. 5; and

Fig. 7 is an end view of a saw mount element present in the invention.

Referring now to the drawings, and more particularly to Fig. 1, 10 indicates generally a chain saw power unit having an internal combustion engine 11, frame structure 12 mounting engine 11, and handles 13, 14 for manipulating the unit when making a cut. Frame 12 includes a chain saw blade support portion 15 ordinarily used in mounting the saw blade of a chain saw. Motor 11 drives a power output shaft 16 which rotates about an axis extending normal to the plane of blade supporting portion 15.

Projecting out from blade supporting portion 15 are a pair of spaced studs 18 and 19. These studs are externally threaded, and are used in securing a saw blade to support portion 15. As so far described, the power unit is conventional and exemplary of the many different types sold on the market today.

The attachment of this invention comprises an elongated hollow tube or mounting section 26, which is secured at its inner end to support portion 15 through a bracket 27. Bracket 27 has a handle 28 extending outwardly to the left in Fig. 1, to assist the operator in manipulating the power unit and attachment after they are secured together as a unit. Mounted for reciprocal movement to and fro longitudinally of the tube section, and at the outer end of the section, is an exposed, reciprocating type pruning saw blade 29. The pruning saw blade is relatively narrow, and has exposed cutting and trailing edges, so that the saw blade can pass bodily downwardly through a saw kerf produced by the blade.

Referring now to Figs. 5, 6, and 7, saw blade 29 is supported at the outer end of tube section 26 by means of a reciprocating plunger element or saw mount 31. The saw is secured within a slot 35 cut in the outer end of mount 31 by nut and bolt assemblies 30, and the inner end of mount 31 is slidably received within the hollow end of the tube section. The saw mount has an enlarged head portion 32, which joins with a shank portion 33 of diminished diameter along a shoulder 34. Shoulder 34, on striking the outer end of tube section 26, limits inward movement of the saw mount. The diameter of shank portion 33 is only slightly less than the inner diameter of the tube section, and thus a snug fit is provided between the two.

The saw mount is maintained from rotary movement about its longitudinal axis relative to the tube section by means of a pin 36 inserted through an accommodating bore prepared in the tube section and held in place by an enveloping clamp 37. The inner end of pin 36 rides in a slot 41 prepared in the shank portion of the saw mount. Clamp 37 is tightened in place by a nut and bolt assembly 38.

It will be noted that the saw blade projects outwardly from the end of the tube section and is mounted only at its inner end. Thus the remainder of the saw blade is completely exposed and free to ride without obstruction through a saw kerf. Weight considerations dictate the use of a relatively narrow saw, and for this reason it is important that the trailing edge of the saw blade, i.e., the edge opposite its cutting edge, be uncovered and free to ride through a saw kerf.

Referring again to Fig. 1, a rest 48 may be mounted at the outer end of the attachment by securing a heel portion of the rest on tube section 26. This rest has forward edge portions 49, one on each side of the saw blade, which are used in steadying the saw during a cutting pass.

Saw mount 31 has extending axially through its center an elongated bore 51. The bore terminates at the inner end of the mount against a wall 52. Wall 52 has a relatively small hole extending axially through its center, through which is threaded the end of a flexible cable 53.

Cable 53 has affixed to its outer end a button 56. The inner end surface of button 56 abuts wall 52, and when the cable is tensioned, the button is forced against wall 52 and then pulls the saw mount from right to left viewing the device as shown in Fig. 5.

In practice, the cable end is mounted in the saw mount by inserting the opposite end of the cable through bore 51 and the small accommodating hole in wall 52. The cable length is then pulled through the saw mount until button 56 comes in contact with wall 52.

Rearwardly of the inner end of saw mount 31 and joined with the inner wall of tube section 26 is an annular seating wall 61. Annular wall 61 seats the inner end of a coil compression spring 62. The other end of compression spring 62 engages the outer face of wall 52. Spring 62 functions as a biasing means urging the saw mount from a retracted to an extended position relative to the tube section.

Referring now in particular to Figs. 2 and 3, the inner end of cable 53 is secured to a crank member 66 which is nonrotatably fixed to the power output shaft of motor 11. The crank member operates periodically to pull the cable inwardly against the force of spring 62. Power output shaft 16 has an externally threaded end portion receiving a nut 68, and also is provided with a key slot which mounts a key 67. Member 66 is mounted on shaft 16 as shown in Fig. 2, with the member keyed to the shaft and held in place by nut 68.

Rotatably secured by a pin screw 71 to a radially offset portion of crank member 66 is a sheave 73 having an annular groove formed about its periphery. A loop 76 is prepared at the inner end of the cable by turning over its end and then clipping the end to the cable by clips 77. The cable loop is trained about the annular groove of sheave 73. The sheave and loop construction enable the crank member to rotate and thus to produce in and out movement of the cable without fraying or wear of the cable.

As best shown in Fig. 2, bracket 27 is secured to blade support portion 15 by inserting studs 18, 19 through bores provided in the bracket, and clamping the bracket tightly against support portion 15 using nuts 81. Clamps 82 and screw assemblies 88 hold tube section 26 on bracket 27. Referring to Fig. 4, bracket 27 has an elongated, shallow indentation 86 which assists in maintaining tube section 26 and bracket 27 properly aligned.

By use of clamps 82, tube section 26 is adjustably shiftable lengthwise relative to brackets 27. It is important that the tube section be adjustable, as the tube section carries annular wall 61 which seats the inner end of coil spring 62, and adjustment of the position of the tube section varies the biasing action of coil spring 62. For a given length of cable, it will be seen that movement of the tube section outwardly relative to bracket 27 serves to increase the biasing action of spring 62, whereas movement in the other direction decreases the biasing action.

In summary, it will be noted that the organization described is characterized by a number of features contributing to its utility. The hollow tube section possesses good rigidity for relatively light mass. The walls of the tube section also shield the cable, preventing the cable from becoming entangled in brush or other matter. The action of the saw blade is produced by a spring and a periodic tensioning means, as these components produce the required reciprocal action and also are relatively light in weight.

It should be obvious that the parts and their arrangement may be varied to produce a similar construction differing in details from the particular embodiment illustrated. It is desired not to be limited to the specific embodiment illustrated, but to cover all modifications and variations which would be apparent to one skilled in the art and that come within the scope of the appended claims.

It is claimed and desired to secure by Letters Patent:

1. In combination with a portable chain saw unit having a motor, a power output shaft, and a chain saw blade support portion adjacent said power output shaft, a pruning saw attachment comprising an elongated hollow tube section and means at the inner end thereof securing said tube section to said chain saw blade support portion, an elongated pruning saw blade with exposed cutting and trailing edges, means mounting said pruning saw blade at the outer end of said tube section accommodating reciprocal movement of the blade with the outer end of the blade fully exposed and carried outwardly of said tube section, a crank member secured to said output shaft to rotate therewith, and power transmitting means connecting said crank member and pruning saw blade extending through the hollow interior of said tube section.

2. A pruning saw attachment for a portable chain saw unit having a motor, frame, and power output shaft, the attachment comprising an elongated hollow tube section and means at the inner end of said tube section for connecting the section to said frame, an elongated pruning saw blade and means mounting said pruning saw blade at the outer end of said tube section accommodating reciprocal movement of the blade, bias means interposed between said tube section and pruning saw blade urging the blade in one direction relative to said tube section, and tensioning means extending through the hollow interior of said tube section connectable with the output shaft of said motor for periodically urging said pruning saw blade in a direction opposite to said one direction.

3. For a portable motor having a power output shaft and a motor supporting frame, a pruning saw attachment comprising an elongated rigid mounting section and means for securing one end of said section to said frame, a pruning saw mount nonrotatably and slidably mounted in the other end of said mounting section for reciprocal movement longitudinally of the mounting section, an elongated reciprocating-type pruning saw blade with exposed cutting and trailing edges, means securing the inner end of said pruning saw blade to said saw mount with the outer end of the blade fully exposed and carried outwardly of said mounting section, biasing means urging said saw mount in a direction away from said one end of said mounting section, and tensioning means connectable with said output shaft for periodically urging said saw mount in a direction toward said one end of said mounting section.

4. For a portable motor having a power output shaft and a motor supporting frame, a pruning saw attachment comprising an elongated rigid mounting section and means for securing one end of said section to said frame, a saw mount nonrotatably and slidably mounted in the other end of said mounting section for reciprocal movement longitudinally of the mounting section, an elongated reciprocating-type pruning saw blade with exposed cutting and trailing edges, means securing the inner end of said pruning saw blade to said saw mount with the blade fully exposed and carried outwardly of said mounting section, biasing means urging said saw mount in a direction away from said one end of said mounting section, and tensioning means for urging said saw mount in the opposite direction; said tensioning means comprising a crank member connectable with said power output shaft and a cable connecting said crank member and saw mount.

5. The device of claim 4 wherein said mounting section comprises an elongated hollow tube section, and wherein said cable extends through the hollow interior of said tube section.

6. The device of claim 5 wherein said means for securing one end of said mounting section to said frame further includes means accommodating longitudinal shifting adjustment of said mounting section.

7. In combination with an internal combustion, portable chain saw unit having a motor, a power output shaft, and a chain saw blade support portion adjacent said output shaft, a pruning saw attachment comprising a bracket secured to said chain saw blade support portion, an elongated hollow tube section secured at one end to said bracket, an elongated pruning saw blade, means secured to the inner end of said saw blade mounting the blade with the blade projecting outwardly of the other end of said tube section, said last-mentioned means accommodating reciprocal movement of said saw blade longitudinally of said tube section, biasing means interposed between said tube section and saw blade urging said saw blade to an extended position relative to said tube section, cable tensioning means connected at one end to said blade and extending through the hollow interior of said tube section, and a crank member connected to said output shaft, the other end of said cable tensioning means being connected to said crank member.

8. The device of claim 7 wherein said cable tensioning means is connected to said crank member by means of a rotatable sheave and a loop prepared in said other end of said cable trained over said sheave.

9. The device of claim 7 wherein said tube section is adjustably shiftable in the direction of its length relative to said bracket.

No references cited.